United States Patent [19]
Collier et al.

[11] Patent Number: 5,903,980
[45] Date of Patent: *May 18, 1999

[54] HAND TOOL

[75] Inventors: John Arthur Collier, London; Laurence John Potter, Birmingham, both of United Kingdom

[73] Assignee: Monument Tools Ltd., United Kingdom

[*] Notice: This patent issued on a continued prosecution application filed under 37 CFR 1.53(d), and is subject to the twenty year patent term provisions of 35 U.S.C. 154(a)(2).

[21] Appl. No.: 08/722,052
[22] PCT Filed: Apr. 4, 1995
[86] PCT No.: PCT/GB95/00765
 § 371 Date: Nov. 13, 1996
 § 102(e) Date: Nov. 13, 1996
[87] PCT Pub. No.: WO95/28247
 PCT Pub. Date: Oct. 26, 1995

[30] Foreign Application Priority Data

Apr. 16, 1994 [GB] United Kingdom .................... 9407617

[51] Int. Cl.⁶ ................................................. B23D 21/08
[52] U.S. Cl. ................................................ 30/101; 30/102
[58] Field of Search ................................ 30/92, 95, 101, 30/102

[56] References Cited

U.S. PATENT DOCUMENTS

| | | | |
|---|---|---|---|
| 1,505,205 | 8/1924 | Kilgour, Jr. | 30/102 |
| 1,945,949 | 2/1934 | Myers | 30/102 |
| 1,977,441 | 10/1934 | Kenerson | 30/102 |
| 2,007,122 | 3/1935 | Briegel . | |
| 2,502,701 | 4/1950 | Capewell | 30/102 |
| 2,706,853 | 4/1955 | Wilson | 30/102 |
| 2,817,898 | 12/1957 | Vermette | 30/102 |
| 3,118,227 | 1/1964 | Samuels et al. | 30/102 |
| 3,145,469 | 8/1964 | Petersen . | |
| 3,714,712 | 2/1973 | Hoffman | 30/95 |
| 3,748,935 | 7/1973 | Beauchet . | |
| 4,402,136 | 9/1983 | Rast | 30/101 |
| 4,739,554 | 4/1988 | Hytonen | 30/101 |
| 4,831,732 | 5/1989 | Garton | 30/101 |
| 4,852,255 | 8/1989 | Hochfeld | 30/102 |
| 5,206,996 | 5/1993 | McDaniel | 30/101 |
| 5,230,150 | 7/1993 | Sperti | 30/101 |
| 5,345,682 | 9/1994 | Dubinsky et al. | 30/102 |

FOREIGN PATENT DOCUMENTS

| | | |
|---|---|---|
| 0204802 | 3/1991 | European Pat. Off. . |
| 1 275 909 | 6/1972 | United Kingdom . |
| WO 90/05610 | 5/1990 | WIPO . |

Primary Examiner—Hwei-Siu Payer
Attorney, Agent, or Firm—Cantor Colburn LLP

[57] ABSTRACT

A pipe cutter having an over-center feature which facilitates automatic charging of a spring to which a cutter is mounted.

23 Claims, 3 Drawing Sheets

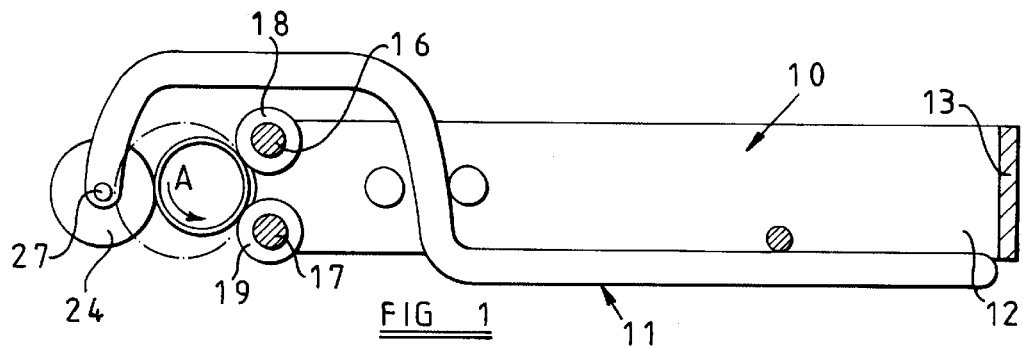
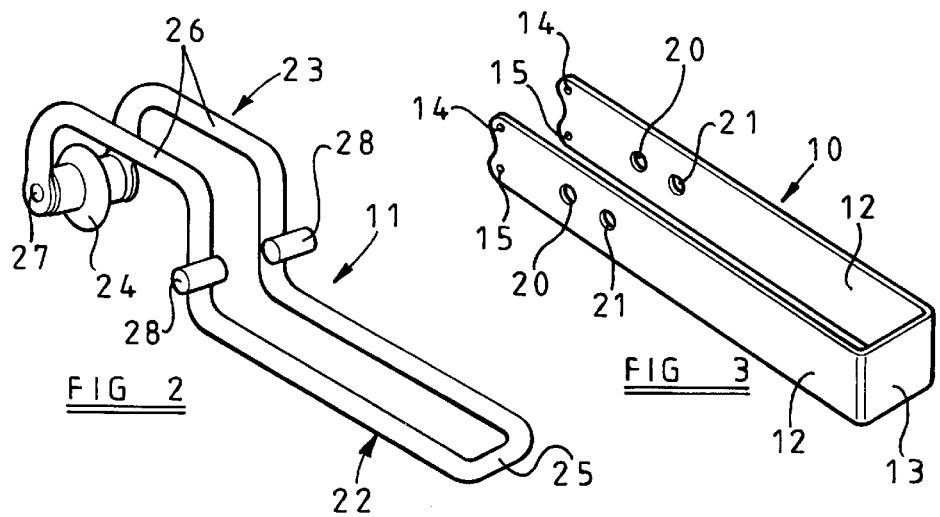
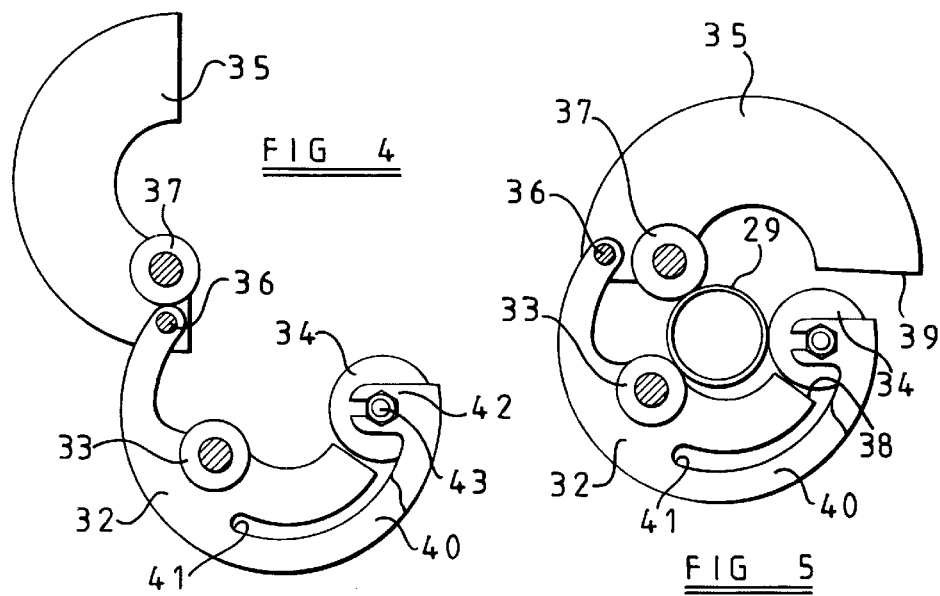

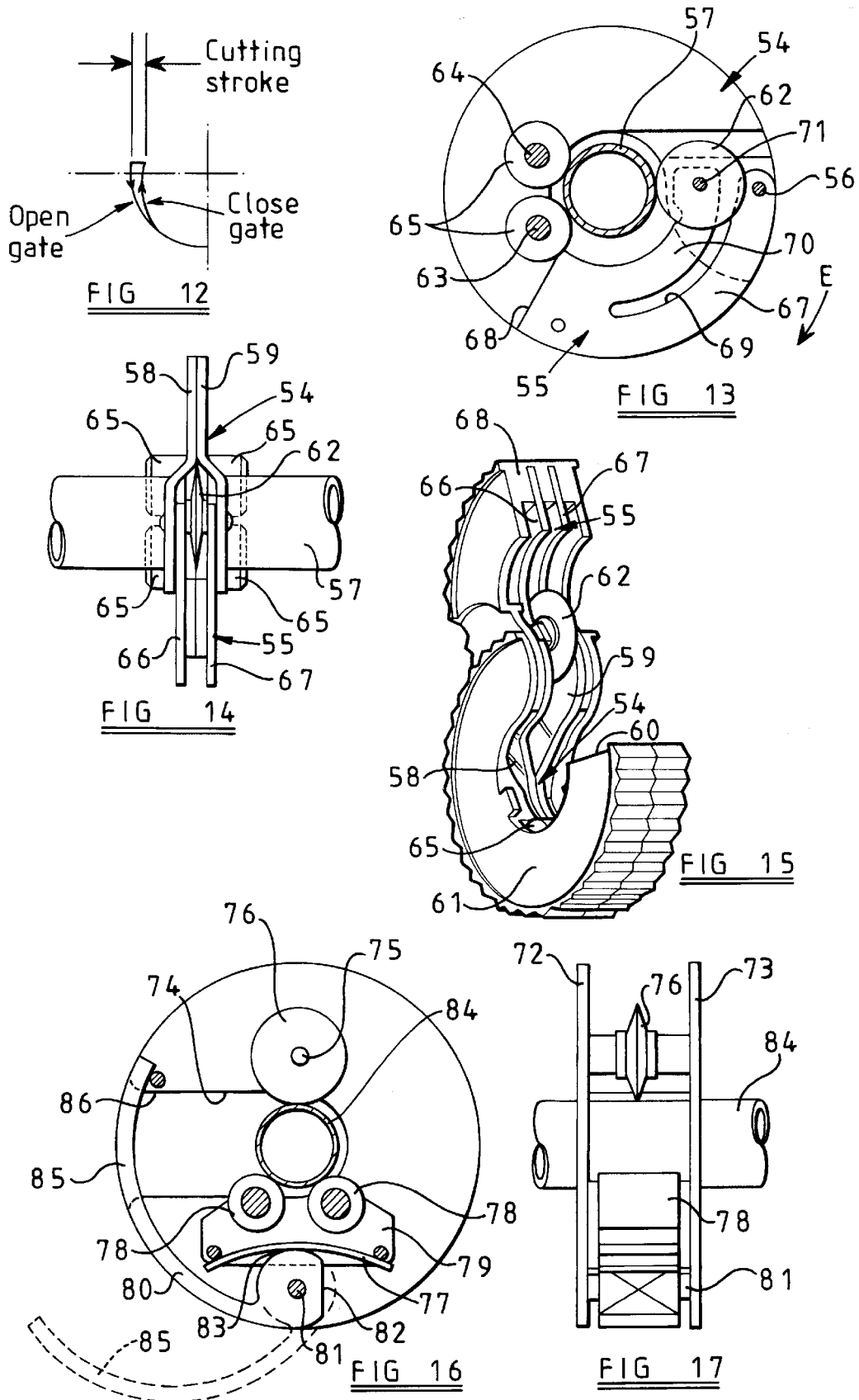

HAND TOOL

BACKGROUND OF THE INVENTION

1. Field of the Invention

This invention relates to a hand tool for cutting pipe, particularly copper pipe such as that used in central-heating installations. As used herein, 'cutting' includes providing a circumferential groove in the pipe.

2. Prior Art

Various forms of hand tools for cutting pipe are known, such pipe cutters generally having a rotatably mounted cutting wheel for engaging, in use, one side of the pipe, which is supported at its opposite side by a pair of spaced rollers.

In one form, the pipe cutter is adjustable to enable a range of different diameter pipes to be cut. This is accomplished by providing screw or other means for effecting relative adjustment movement between the cutting wheel and the rollers. Once a size of pipe is clamped tightly between the cutting wheel and the rollers, cutting is carried out by relative rotation between the tool and the pipe, normally by rotating the tool around a fixed pipe. PCT Specification No. WO90/05610 shows adjustable pipe cutters of this form, one of which has the cutting wheel axle fixed in one body part which is hinged to a second body part. The two body parts are urged together by a strong compression spring acting between them.

European Patent specification No. 0204802 B discloses a further form of pipe cutter designed for cutting a particular size of pipe. The device has a rotatable cutting wheel mounted on a shaft which is movable in one direction along an arcuate track when a pipe is inserted into a central hole of the device through an entry slot. After insertion the wheel snaps forward so that the pipe is held in engagement with a pair of spaced rollers at one of its sides, and with the cutting wheel at its opposite side. Thereafter relative rotation in one direction between the tool and the pipe causes the wheel to rotate and bite into the pipe as the cutting wheel shaft rotates and moves along the arcuate track in the opposite direction to its movement on pipe insertion. During such movement, the shaft presses against, and is pressed inwards by, strip springs which define part of the arcuate track. Continued relative rotation effects cutting of the pipe. Whilst this cutter is generally satisfactory in use, it is relatively expensive to produce.

SUMMARY OF THE INVENTION

An object of the invention is to provide an improved hand tool for cutting pipe.

According to a first aspect of the present invention, a hand tool for cutting pipe comprises a body having first and second body parts relatively movable together and apart, pipe support means for supporting a pipe to be cut, in use, upon relative rotation between the body and the pipe about the pipe longitudinal axis, a circular cutter arranged, in use, at right angles to said pipe longitudinal axis, and rotatable by frictional contact of its edge with the pipe, and energy storage means associated with one of the body parts, the arrangement being such that, in use, with the pipe to be cut engaging said pipe support means, relative movement together of said first and second body parts charges said energy storage means so as urge the pipe support means and the cutter relatively towards each other, whereby the pipe is severed by the cutter edge as said relative rotation occurs.

BRIEF DESCRIPTION OF THE DRAWINGS

The invention will now be described, by way of example, with reference to the accompanying drawings, in which:

FIG. 1 is a schematic side view of a first embodiment of a hand tool of the invention, with one side of a body part of the tool removed for clarity;

FIGS. 2 and 3 are perspective views of a cutter carrier and a casing respectively of the hand tool of FIG. 1;

FIGS. 4, 5 and 6 are respective interior sectional side views of a second embodiment of a hand tool of the invention, FIG. 4 showing the tool open prior to pipe insertion, FIG. 5 showing a pipe inserted and the tool partly closed, and FIG. 6 showing the tool closed with the pipe located therein reading for cutting;

FIG. 12 is a diagram showing the path of the centre of the cutter through the stages of FIGS. 8 to 10 and the subsequent cutting stage;

FIG. 13 is an interior sectional side view of a fourth embodiment of a hand tool of the invention, with a pipe inserted and the tool ready to cut the pipe;

FIG. 14 is an end view of part of the hand tool of FIG. 13;

FIG. 15 is a perspective view of the hand tool of FIG. 13 in an open state ready for initial pipe insertion;

FIG. 16 is a schematic interior sectional side view of a fifth embodiment of a hand tool of the invention, with a pipe inserted and the tool ready for cutting; and FIG. 17 is an end view corresponding to FIG. 16.

DETAILED DESCRIPTION OF THE INVENTION

Figure 6:
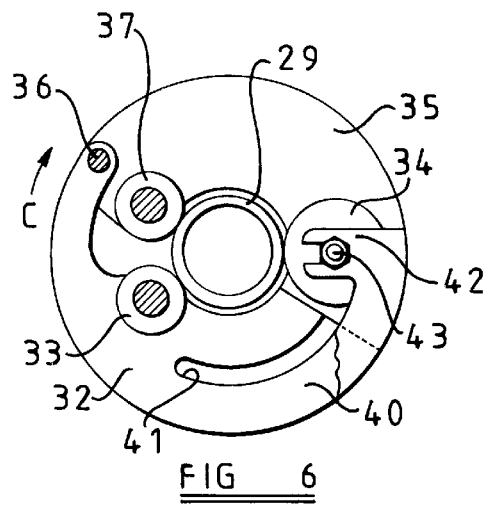

A first embodiment of a hand tool of the present invention, in the form of a pipe cutter, is shown in FIGS. 1 to 3. Apart from this first embodiment, all other embodiments of pipe cutters of the invention will be described as having been designed for a particular size of pipe. However, these could also incorporate adjustment means in relation to the cutter wheel and/or support rollers.

As shown in FIG. 1, the cutter basically comprises a main body part 10 and a secondary body part in the form of an operating member 11 which is pivotally mounted on the main body part. The general shape of the body part is shown in FIG. 3, this being a steel pressing in the form of a pair of parallel spaced rectangular sides 12 integrally connected by an end wall 13. As shown in FIG. 3, the free end of each side has upper and lower holes 14, 15 respectively. As shown in FIG. 1, these are to receive shafts 16, 17 respectively for mounting respective upper and lower rollers 18, 19. As can be seen from FIGS. 1 and 3, the free end edges of the sides 12 are of arcuate form so that, as shown in FIG. 1, circular section pipe can be engaged at said end edges, supported by the rollers. As shown in FIG. 3, the sides 12 are provided mid-way between their upper and lower edges with a pair of spaced holes 20, 21 respectively, the hole 20 in one side being in direct alignment with a hole 20 in the opposite side. These holes are for pivotally mounting the operating member 11 either of two alternative positions, as will be described. However, it will be appreciated that one of the pair of holes 20, 21 could be omitted so that the pipe cutter is for cutting a particular size of pipe only.

As best shown in FIG. 2, the operating member 11 is largely composed of a single piece of a deflectable resilient member in the form of a spring tempered wire bent to provide a rear, manually actuating portion 22 and a forward portion 23 for rotatably mounting a circular cutting wheel 24.

The rear portion 22 is formed as a pair of straight parallel lengths of the wire connected by a curved end part 25. At their end remote from the part 25, the lengths extend upwardly and then forwardly to form upper lengths 26 which are then turned downwardly, with a pivot shaft 27 being fixedly connected between the respective free ends of the downwardly turned lengths of the wire to mount the cutting wheel 24 in a rotatable manner. Between the upper and lower lengths are provided cylindrical pivot pegs 28. By pressing the pegs inwardly towards one another, the operating member 11 can be compressed sufficiently for it to be received within the body part 10, with the pivot pegs 28 being received in aligned holes 20 or 21 depending upon the size of pipe to be cut. FIG. 1 schematically shows the operating member with the pegs 28 in the holes 21 thereby for the cutting of the smaller of the two sizes of tube with which the cutter can be used.

In operation, the operating member 11 is pivoted by depressing the actuating portion 22 so that the cutting wheel is raised generally clear of the front of the cutter at which the rollers 18, 19 are disposed. A circular section pipe can then be located as shown in FIG. 1 in engagement with the rollers which thus serve to locate it in position at the front of the body part. The actuating portion can then be raised so that the operating member 11 pivots to bring the cutting wheel 24 down into engagement with the surface of the pipe. The distance of the pivot of the operating member 11 front the centre axis of the cutting wheel 24 is such that continued upward movement of the actuating portion 22 causes tension to be developed in the forward portion 23 of the operating member, with the tension developed (i.e. energy stored) in the wire thus acting as a spring. The cutting wheel reaches its FIG. 1 position where it is slightly over-centre, i.e. the axis of the cutting wheel lies below the line which connects the centre of the pipe and the axis of the pivot, and passes midway between the rollers 18, 19. This provides a positive 'snap-on' to the pipe prior to the start of the cutting operation. In this position, the cutting wheel 24 is being urged into tight engagement with the pipe by virtue of the tension developed in the operating member 11. Accordingly if relative rotation, i.e pipe rotation in the direction of Arrow A, now takes place between the pipe and the pipe cutter, the cutting wheel 24 rotates by virtue of the frictional contact of its edge with the pipe, this edge biting into the material of the pipe and severing it after a certain number of relative turns. The energy stored in the 'spring', i.e. the forward portion 23, is dissipated as the edge of the cutter breaks through the material of the pipe to effect said cutting.

In an alternative form of this embodiment, only the forward portion 23 need be formed as a spring, with the actuating portion 22 rearward of the pivot possibly being formed as a manually operable control rod or the like. Moreover, if desired the operating member could be pivotally carried by a pressing which would be slidably adjustable along the top of the body part 10 and lockable in position by the use of a slot in the top of said body part, a corresponding adjustment slot being provided in each of the sides 12. In this manner the cutting wheel 24 could be adjusted towards or away from the rollers 18, 19 in respect of the operating position shown in FIG. 1, to cut different diameters of pipe. For the embodiment actually shown in FIGS. 1 to 3, the alternative size of pipe which can be cut is shown in phantom in FIG. 1, this relating to the alternative position of the operating member 11 by the use of the holes 20 shown in FIG. 3. Whether the cutter is adapted for only one size of pipe or for several sizes, variation in the position of the pivot point would increase or decrease the number of turns required between the cutter and the pipe to effect severing, as the cutting wheel, which is at right angles to the axis of the pipe, would be more strongly or less strongly urged into engagement therewith.

FIGS. 4 to 7 relate to a second embodiment of a hand tool of the present invention in the form of a cutter for a circular section pipe 29, normally of copper.

Basically the cutter has a body formed of a pair of spaced, generally parallel, metallic side plates 30, 31, each being formed in two parts, namely a first part 32, which carries a first cylindrical pipe supporting roller 33 and a circular cutting wheel 34, and a second part 35, which is pivotally connected to part 32 at 36, the part 35 carrying a second pipe supporting roller 37. When the parts 32 and 35 are closed together, FIGS. 6 and 7, the body is of circular shape, a free end surface 38 of part 32 engaging a free end surface 39 of part 35 to complete the circular form. The plates 30, 31 can be connected together by the pivot 36 and/or the axles carrying the rollers 33, 37, with nuts or similar fixing components on their opposite ends at the exteriors of the plates respectively. However, the plates 30, 31 can be connected together by any other suitable means. An outer casing would normally be provided in two parts around the plates, secured to the two pivoted parts of the body respectively, for ease of use and improved appearance.

The end of each side plate part 32 remote from the pivot 36 is formed with an arcuate arm 40 at the outer periphery of the part 32, the arm 40 being integrally formed with the remainder of part 32 but separated from the inner portion of the part which defines end surface 38 by a slot 41 in side view (FIGS. 4 to 6). The arm 40 extends circumferentially beyond surface 38 and is angled inwardly of its associated side plate part (FIG. 7), terminating in a cutter mounting portion 42 which lies parallel to the plane of the remainder of the side plate part.

Figure 7:
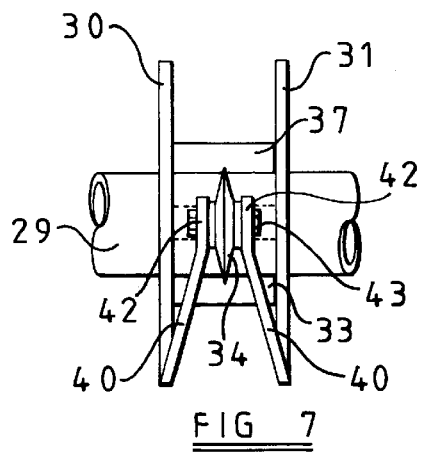
FIG. 7 is an end view corresponding to FIG. 6.

As shown in FIG. 7 for the complete body, the two mounting portions of the arms 40 of the side plates 30, 31 respectively mount the circular cutting wheel 34 between them, the wheel being rotatably mounted on an axle 43 fixed to the portions 42 against rotation. The cutting wheel lies centrally between the two side plates and at right angles to the axis of the pipe 29 to be cut.

Together the two arms constitute energy storage means (a deflectable resilient member) in the form of a composite spring arm of arcuate form extending for just over 180° of the periphery of the pipe cutter.

In use, the cutter device is placed in its open state, FIG. 4, and the pipe 29 is placed onto part 32 to engage the roller 33 and cutting wheel 34. The part 35 is then freely pivoted down towards the part 32, so that the roller 37 engages against the pipe, as shown in FIG. 5. The device is now in a position ready for the part 35 to be forced onto part 32 to close the device around the pipe. As such closing takes place, the roller 37 forces the pipe to its FIG. 6 position, such pipe movement causing the composite spring arm to move somewhat outwardly about the respective integral junctions of arms 40 with the remainder of their associated parts 32, the cutting wheel axis moving outwardly generally along the horizontal line through the pipe axis, shown in FIG. 6, thereby tensioning the composite spring arm. The closing of the part 35 onto the part 32 results, as shown in FIG. 6, in the roller 37 moving overcentre relative to a line through the pivot 36 and the centre of the pipe. This thus effects a firm locking or snap-fit together of the two parts. The tension (energy stored) in the arms 40 is urging the cutting wheel towards the pipe support rollers, so that there is strong frictional contact between the edge of the cutting wheel and the pipe surface. Accordingly relative rotation between the locked pipe cutter and the pipe in one direction (Arrow C for pipe cutter rotation), will cause the cutting wheel to cut the pipe. As stated, the cutting wheel cuts through the pipe during such rotation as a result of the force (energy stored) in the spring arm, this force being relieved once cutting is completed. The wheel is in its FIG. 4 position after cutting.

The embodiment of the invention shown in FIGS. 8 to 12 has a deflectable resilient member in the form of a composite spring arm which operates in a similar manner to that of the pipe cutter embodiment FIGS. 4 to 7, but differs mainly in that the pipe support rollers are dispensed with, support for the pipe at the opposite side from the cutting wheel being provided by the shape of the body itself. This embodiment provides a pipe cutter which is intended to be disposable, in that its manufacturing costs would be relatively low with there clearly being fewer parts than with the other embodiments described herein. Whilst it was originally considered that the main body part would be made of a relatively soft plastics material, such as PTFE, to enable rotation to take place between the body and a pipe to effect the cut, it has been found that it may be possible to use a harder plastics material such as polypropylene in that during the cutting process with copper pipe, the portion of the body which supports the pipe tends to become impregnated with copper particles thereby producing a polished cut end.

Figure 8:
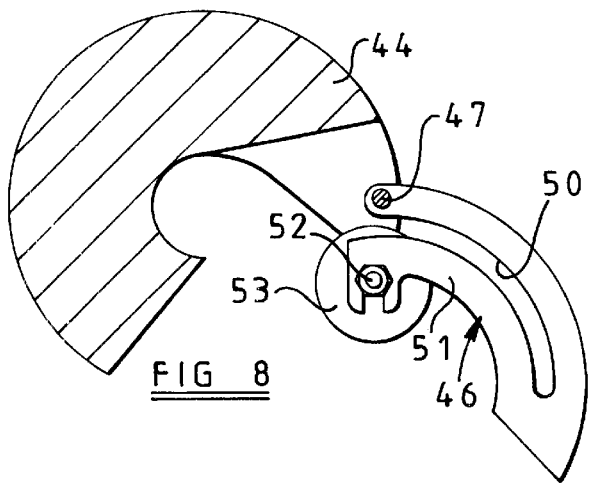
FIG. 8 to 10 are respective sectional side views of a third embodiment of a hand tool of the invention, FIG. 8 showing the tool open prior to pipe insertion, FIG. 9 showing the tool partly closed with a pipe inserted, and FIG. 10 showing the tool closed ready for cutting to commence.
Figure 9:
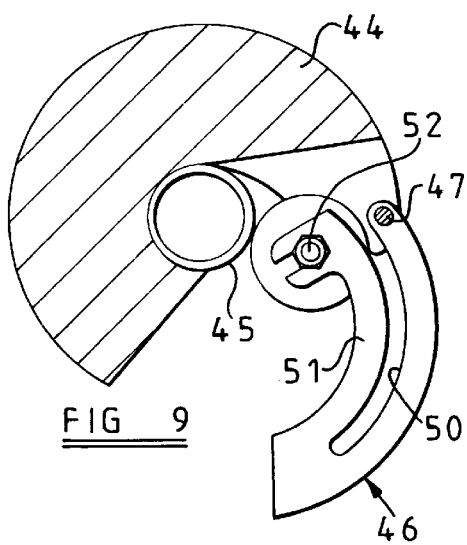
Figure 10:
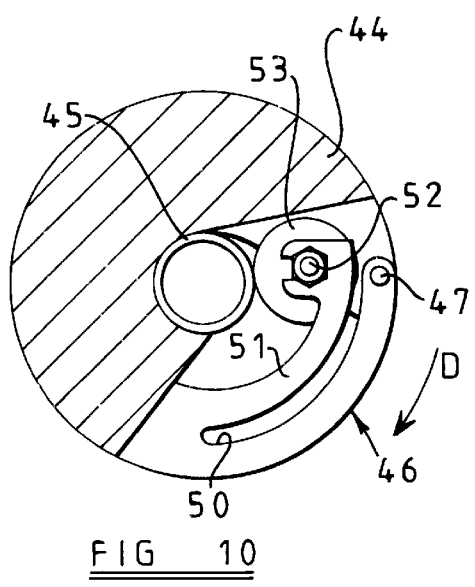

Apart from the omission of the support rollers, it will be appreciated that the embodiment of FIGS. 8 to 12 is of a similar form, and operates in a similar manner to the embodiment of FIGS. 4 to 7. The main part of the body, denoted by the numeral 44, has a central 180° arcuate surface portion to support one half of the pipe 45 to be cut, as shown in FIGS. 9 and 10, with the centre of the tube corresponding to the centre of both the arcuate portion and the body itself. The remaining part 46 of the body is pivoted to the part 44 at 47, so that it can be moved towards or away from the part 44 to open or close the pipe cutter. Both body parts are preferably provided with an outer casing.

Figure 11:
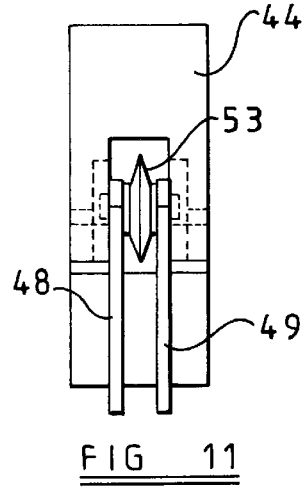
FIG. 11 is an end view corresponding to FIG. 10, but with the pipe not shown.

The part 46 is in the form of two parallel, arcuate sections 48, 49 respectively, each section being divided by an arcuate slot 50 to form energy storage means as an inward arm 51, the respective free ends of the arms 51 of the two sections being connected together by a fixed shaft 52 on which is rotatably carried a cutting wheel 53, this, as shown in FIG. 11, lying centrally of the body and at right-angles to the pipe 45 to be cut. The arms lie in the same planes as the remainder of their respective associated sections. The part 46 of the body is formed of metal and the provision of the slot 50 ensures that each arm 51 is able to be tensioned, in the same way as for arms 40 in the embodiment previously described, so as to urge the cutting wheel into engagement with the pipe when the arms carrying the cutting wheel have been put into tension, i.e. into the energy stored state. The arms 51 together form the composite spring arm previously mentioned. The outer portions of the part 46, separated from the arms by the slots, continue the periphery of the circular cutter device when the two body parts are closed together (FIG. 10).

FIG. 12 shows the path of the cutting wheel axis as the cutter device is opened, the path being an arc of a circle centred on pivot 47, the axis being over-centre in the closed state of the device (FIG. 10).

In use, with the assembly open, as shown in FIG. 8, by virtue of the part 46 being pivoted outwardly relative to the part 44, a pipe 45 is inserted into the cutter device so as to be supported at the centre of the main body part 44 as shown in FIG. 9. The part 46 is then moved towards part 44. Initially the cutting wheel contacts the pipe loosely, FIG. 9, with arms 51 untensioned. Further closing causes the pipe to exert pressure in an outwards direction on the cutting wheel, such pressure tensioning the arms 51. Eventually upon full closing, FIG. 10, the arms are at maximum tension and the cutting wheel has moved to an over-centre position relative to the horizontal line shown through the pivot 47 and tube longitudinal centre axis, so as firmly to hold the two parts 44 and 46 closed together as an effective snap-fit. The arc travelled by the cutting wheel axis during such closing is shown in FIG. 12, the end of this being displaced outwardly relative to the start of the arc followed on opening, the displacement corresponding to the tensioning (energy storage) of the arms. Rotation of the cutter device in the direction D shown in FIG. 10 then produces cutting of the tube by virtue, as before, of the stored energy in the tensioned composite spring arm urging the cutting wheel against the pipe surface, this energy being dissipated as cutting proceeds and the arms 51 eventually move inwardly to their respective untensioned positions.

The embodiment of the invention shown in FIGS. 13 to 15 is again intended to provide a relatively inexpensive, and possibly disposable, pipe cutter. The pipe cutter has a main body part 54 and a further body part 55 pivoted to the part 54 at a pivot axis 56, so that as in the second and third embodiments described, the body parts can be closed together about a pipe 57 to be cut. Essentially the pipe cutter of this embodiment differs from that of the third embodiment only by having pipe support rollers on its main body part instead of engaging the pipe, in use, directly against the main body part.

The main body part 54 is made up of a pair of arcuate metallic side plates 58, 59 extending for approximately 235° of arc. Over approximately 180° of such arcuate extent the plates are held in contact, this contact extending from the respective free ends of the plates adjacent an end surface 60 of the cutter casing 61 containing the side plates centrally therein. At the opposite end of the casing 61 the side plates are splayed apart for passage of a cutting wheel 62, as will be described, when the parts 54, 55, are closed together.

As a position inwards of the end surface 60, a pair of spaced pins 63, 64 respectively are secured through the side plates to extend equally at opposite sides thereof, and two cylindrical pipe support rollers 65 are carried on each of the pins, one at the outer side of each side plate, as shown in FIG. 14.

The further body part 55 is in the form of a pair of spaced, parallel arcuate metallic sections 66, 67 which, as shown in FIG. 13, are shaped and sized to complete the circular shape of the complete body of the pipe cutter when the body parts are closed together, in use, an end surface 68 of the casing containing the sections 66, 67 engaging the end surface 60. Each section has an arcuate dividing slot 69 extending inwards from its end remote from casing surface 68, thereby defining for each section an inner arm 70, as with the pivoted body part of the embodiment of FIGS. 8 to 12. Thus the arms 70 together constitute energy storage means (a deflectable resilient member) in the form of a composite spring arm.

At their respective free ends the arms 70 are connected together by a non-rotatable shaft 71 on which is rotatably carried the cutting wheel 62, disposed in the central radial plane of the cutter device. The respective free ends of the remainder of the sections 66, 67 are pivotally connected at 56 to the splayed ends of the side plates 58, 59 respectively. The distance between respective outer surfaces of the sections 66, 67 is less than the distance between the respective inner surfaces of the splayed ends of the side plates, so that the end of the body part 55 from which the slot 69 extends (including the cutting wheel) can be received between the splayed side plates when the body parts are closed together (FIG. 14). The casing containing the sections 66, 67 is stepped at its one end and received within part of the casing 61 to allow for such relative pivoting between parts 54 and 55.

In use, operation is substantially identical with that shown in the embodiment of FIGS. 8 to 12 in that once a pipe 57 has been inserted to engage the rollers 65, the body part 55 is closed onto the pipe, whereupon the composite spring arm formed of arms 70 is tensioned and over-centred, (FIG. 13) as described in the third embodiment for the arms 51 with cutting wheel 53 thereon. Accordingly upon relative rotation in the correct direction 'E' between the pipe and the body, cutting of the pipe will be effected due to the tension in the composite spring arm. The side plates and the sections 66, 67 are conveniently metal pressings whilst the casing is preferably an ABS moulding or a die casting.

The fifth embodiment of the invention, shown in FIGS. 16 and 17, has a main body part formed of a pair of metallic side plates 72, 73. Each side plate is of generally C-shape, providing a parallel sided radial slot 74 extending inwardly from the circular periphery of the plate, the end of the slot being in the form of an arc centred on the central axis of the plate.

At one side of the slot 74 a shaft 75 is non-rotatably fixed to the main body part. The shaft has its axis parallel to the central axis of each plate and is positioned on a line which is normal to the sides of the slot 74 and extends through said central axis. Rotatably carried on the shaft 75 is a circular cutting wheel 76 which projects in side view (FIG. 16) into the end of the slot 74. Instead of having fixed pipe support rollers, as in the first and fourth embodiments, the pipe cutter of this embodiment has its cutting wheel fixed and its pipe support rollers moving upon the charging of energy storage means for subsequent cutting. This movement is effected by pressure on a deflectable resilient member in a form of a blade spring 77 held in the main body part.

The rollers 78 are mounted in the main body part on a slidable element 79 which is moved towards the cutting wheel 76 by the bowing forward of the spring 77, the bowed part either engaging the element 79, and/or one or both of the shafts rotatably mounting the rollers. The movement of the spring can be by the pivoting of a manually operable control element 80, forming a part of the body, and being pivotal about an axis 81 on the main body part. The element 80 has a cam surface including a flat surface 82, which can engage or lie in juxtaposition to the spring 77 so that it is unbowed, and a radially extending arcuate surface 83 which, when the element is pivoted closed, engages the spring to cause it to bow and cause the rollers to force the pipe 84 tightly against the cutting wheel edge, so that, as previously described for the other embodiments, relative rotation between the pipe and the cutter device in one direction causes cutting of the pipe by virtue of the frictional engagement between the wheel and the pipe. As evident from FIG. 16, the cutting wheel axis, the pipe centre and the pivot of member 80 are all on a common line. Moreover, this line bisects normally a line between the centres of the rollers 78.

Thus the tension in the spring 77 stores the energy required to provide the necessary cutting force, by virtue of the biassing towards one another of the rollers and the cutting wheel. The element 80 is preferably formed with an arcuate manually operable part 85 which can be pivoted about axis 81 from its open position, shown in phantom, to close onto the body against an end stop 86 so as to complete the closed cylindrical periphery of the pipe cutter, and tension the spring.

As previously mentioned, although the main intention with the cutter devices of the present invention is that they should be used with only one size of pipe, it would be possible for all of the embodiments described to have some adjustability in relation to the positions of the rollers and/or cutting wheels. Conveniently this could be achieved by the use of some form of slot, particularly in relation to rearwards of forwards movement of the cutting wheel on its spring arm. Such adjustability would compensate for component variations as well as for possible wear or creep. Additionally using the same set of parts it would then be possible to provide the same cutter device adapted for different sizes of tube. In other words the end user would not make use of the adjustability although this would be useful in the manufacture. Thus during manufacturing the same parts could be used to provide pipe cutters for copper tube of 14, 15 or 16 mm diameter by means of a simple adjustment.

Although as described above in relation to the first four embodiments, the urging together of the cutting wheel and the pipe support surface or surfaces is the result of a spring arm carrying the cutting wheel, it would be appreciated that alternatively this urging together could instead be effected by a corresponding spring arm carrying one or both pipe support rollers or the equivalent surface thereof. In a still further embodiment, it might be possible for both the support roller surface or surfaces as well as the cutting wheel to be on spring arms so that there is an urging together of these components at both sides of the pipe rather than at only one side as described herein.

It will be appreciated that cutter devices of the present invention differ from the prior art ones referred to, in that the energy storage means are fully charged (by 'cocking' a spring) by means of the movement of closing together two body parts. With the prior art devices of the European specification, energy to effect the cut is derived only from the relative rotation between the pipe and the cutter device, i.e. by movement of the cutter shaft means along an arcuate slot. As a result the devices can only cut when relative rotation is in one direction. With the devices of the invention cutting can be effected by relative rotation between the pipe cutter and the pipe in both directions, although in the less preferred direction, i.e. opposite to that referred to in the drawings, it may be necessary manually to hold the 'closed' body part in place.

Although the two body parts are shown interconnected and pivoted together, they clearly could be unconnected, or, if connected, need not be pivoted.

A further difference is that the position of the cutting wheel axis is fixed relative to the component carrying it, namely either a spring arm or, in the final embodiment described, the body of the cutter device. It has been explained how the non-guided cutting wheel axis travels along one arcuate path in space during pipe insertion or opening of the device, and a clearly identifiable different arcuate path in space, displaced relative to the first path, during tensioning of the spring means (i.e. during charging of the energy storage means). This is different from the prior art devices where the same or substantially the same arcuate or straight path travelled for the corresponding stages of operation is a result of the positive guiding of the cutting wheel axis.

Whilst the closing together of the first and second body parts around a pipe of a diameter intended for use with the pipe cutter would normally fully charge the energy storage means, full charging may not always occur, for example with a slightly undersized pipe. It is merely necessary that sufficient charging occurs to effect cutting of the pipe when the pipe cutter is subsequently rotated.

We claim:

1. A pipe cutting tool comprising:

a first portion;

a second portion moveable relative to said first portion, an overcenter mechanism including a deflectable resilient member, and one of a cutter and a pipe support supported by said deflectable member, the deflectable member being associated with one of the first and second portions, the other of said first portion and said second portion supporting the other of said cutter and said pipe support, said deflectable resilient member being deflectable upon contact of said one of said cutter and said pipe support with an inserted pipe to be cut upon relative movement of said first and said second portions toward each other, said one of said cutter and said pipe support being automatically moveable upon such contact, from an under-centered position to a centered position and to an over-centered position relative to said pipe, upon continued such relative movement of said portions toward each other, said member being automatically charged by such deflection movement whereby said pipe is automatically cut upon subsequent relative rotation between said pipe and said pipe cutting tool.

2. A pipe cutting tool as claimed in claim 1, wherein the deflectable member is associated with only one of the first and second portions.

3. A pipe cutting tool as claimed in claim 1, wherein the first and second portions are interconnected.

4. A pipe cutting tool as claimed in claim 3, wherein said first and second portions are pivotally interconnected.

5. A pipe cutting tool as claimed in claim 1, wherein the position of an axis of rotation of the cutter is fixed relative to the deflectable member.

6. A pipe cutting tool as claimed in claim 1, wherein the deflectable member comprises at least one spring arm.

7. A pipe cutting tool as claimed in claim 6, wherein the cutter is rotatably mounted on a shaft, which is carried by the spring arm, the position of an axis of rotation of the cutter provided by the shaft being fixed relative to said spring arm.

8. A pipe cutting tool as claimed in claim 6, wherein the spring arm is an integral part of one of the portions.

9. A pipe cutting tool as claimed in claim 8, wherein the spring arm is constituted by a pair of spaced facing arms of one of the portions, each facing arm being formed by the provision of an elongated slot extending from one end of said one of the portions.

10. A pipe cutting tool as claimed in claim 9, wherein the spring arm is constituted by said pair of spaced facing arms of the second portion.

11. A pipe cutting tool as claimed in claim 10, wherein the cutter is rotatably mounted between said facing arms and is received between opposite sides of the first portion when the first and second portions are moved relatively together, in use.

12. A pipe cutting tool as claimed in claim 10, wherein the first portion carries said pipe support in the form of two pairs of rollers.

13. A pipe cutting tool as claimed in claim 10, wherein the second portion is pivotally connected to said first portion adjacent the open end of said elongated slot.

14. A pipe cutting tool as claimed in claim 9, wherein the spring arm is constituted by said pair of spaced facing arms of the first portion.

15. A pipe cutting tool as claimed in claim 14, wherein the cutter is rotatably mounted between said facing arms and is received between opposite sides of the second portion when the first and second portions are moved relatively together, in use.

16. A pipe cutting tool as claimed in claim 14, wherein the first and second portions carry respective pipe support rollers, which constitute said pipe support.

17. A pipe cutting tool as claimed in claim 14, wherein the second portion is pivotally connected to the first portion at its end which is remote from the cutter when the first and second portions are moved fully relatively together, in use.

18. A pipe cutting tool as claimed in claim 9, wherein the first portion defines said pipe support in the form of a central arcuate recess therein.

19. A pipe cutting tool as claimed in claim 18, wherein the first portion is of plastics material.

20. A pipe cutting tool as claimed in claim 1, having a closed, circular outer peripheral surface when the first and second portions are moved fully relatively together, in use.

21. A pipe cutting tool as claimed in claim 6, wherein the first portion is of elongated form having the pipe support in the form of a pair of spaced, parallel rollers mounted at one of its ends, and the second portion is an operating member pivotally mounted to the first portion, the operating member having at least an end portion thereof, at which the cutter is rotatably mounted, of spring wire to constitute said spring arm.

22. A pipe cutting tool as claimed in claim 21, wherein the position of the pivotal mounting of the operating member relative to the first portion can be adjusted to allow different diameters of pipe to be cut, in use.

23. A pipe cutting tool as claimed in claim 1, wherein said one of said cutter and said pipe support has an axis of rotation, said overcenter mechanism being arranged so that said axis travels in a first path during charging of said member and a different path during cutting of said pipe.

* * * * *